United States Patent [19]

Wolf et al.

[11] Patent Number: 4,601,678
[45] Date of Patent: * Jul. 22, 1986

[54] TORSIONALLY RESILIENT COUPLING WITH A CONNECTING ELEMENT

[75] Inventors: Franz J. Wolf; Hubert Pletsch, both of Bad Soden-Salmünster, Fed. Rep. of Germany

[73] Assignee: WOCO Franz-Josef Wolf & Co., Fed. Rep. of Germany

[*] Notice: The portion of the term of this patent subsequent to Nov. 12, 2002 has been disclaimed.

[21] Appl. No.: 640,839

[22] Filed: Aug. 15, 1984

[30] Foreign Application Priority Data

Sep. 14, 1983 [EP] European Pat. Off. ...... 83 109086.5

[51] Int. Cl.⁴ .................... F16D 3/76; F16D 13/64
[52] U.S. Cl. .................................. 464/83; 192/106.1
[58] Field of Search ............... 192/55, 106.1; 464/83, 464/85, 87, 89

[56] References Cited

U.S. PATENT DOCUMENTS

| | | | |
|---|---|---|---|
| 3,148,756 | 9/1964 | Romanini | 464/87 X |
| 4,249,396 | 2/1981 | Ziegler | 464/83 |
| 4,252,227 | 2/1981 | Staub, Jr. | 464/83 X |
| 4,291,790 | 9/1981 | Staub, Jr. | 192/106.1 X |
| 4,300,363 | 11/1981 | Mathues | 464/87 X |

FOREIGN PATENT DOCUMENTS

| | | |
|---|---|---|
| 112960 | 7/1984 | European Pat. Off. . |
| 2212468 | 10/1973 | Fed. Rep. of Germany ... 192/106.1 |
| 3243644 | 5/1984 | Fed. Rep. of Germany . |
| 804916 | 2/1981 | U.S.S.R. .................... 464/83 |

*Primary Examiner*—Stuart S. Levy
*Assistant Examiner*—Daniel P. Stodola
*Attorney, Agent, or Firm*—Webb, Burden, Robinson & Webb

[57] ABSTRACT

Torsionally resilient coupling with, between two coupling halves, at least one movement-transforming intermediate element which transforms a rotation into a translation and is connected frictionally in rotation to one of the two coupling halves and is connected in translation to a connecting element which is in turn articulated pivotably to a resilient intermediate element which is in turn connected frictionally and integrally in rotation to the respective other coupling half. In this coupling a maximum degree of symmetry of the forces acting is achieved, and shear forces which lead to an asymmetrical stressing of the resilient intermediate elements are eliminated in that the journal pins or journal bolts by which the connecting element if articulated to the resilient intermediate element are guided in lateral slot slits.

3 Claims, 2 Drawing Figures

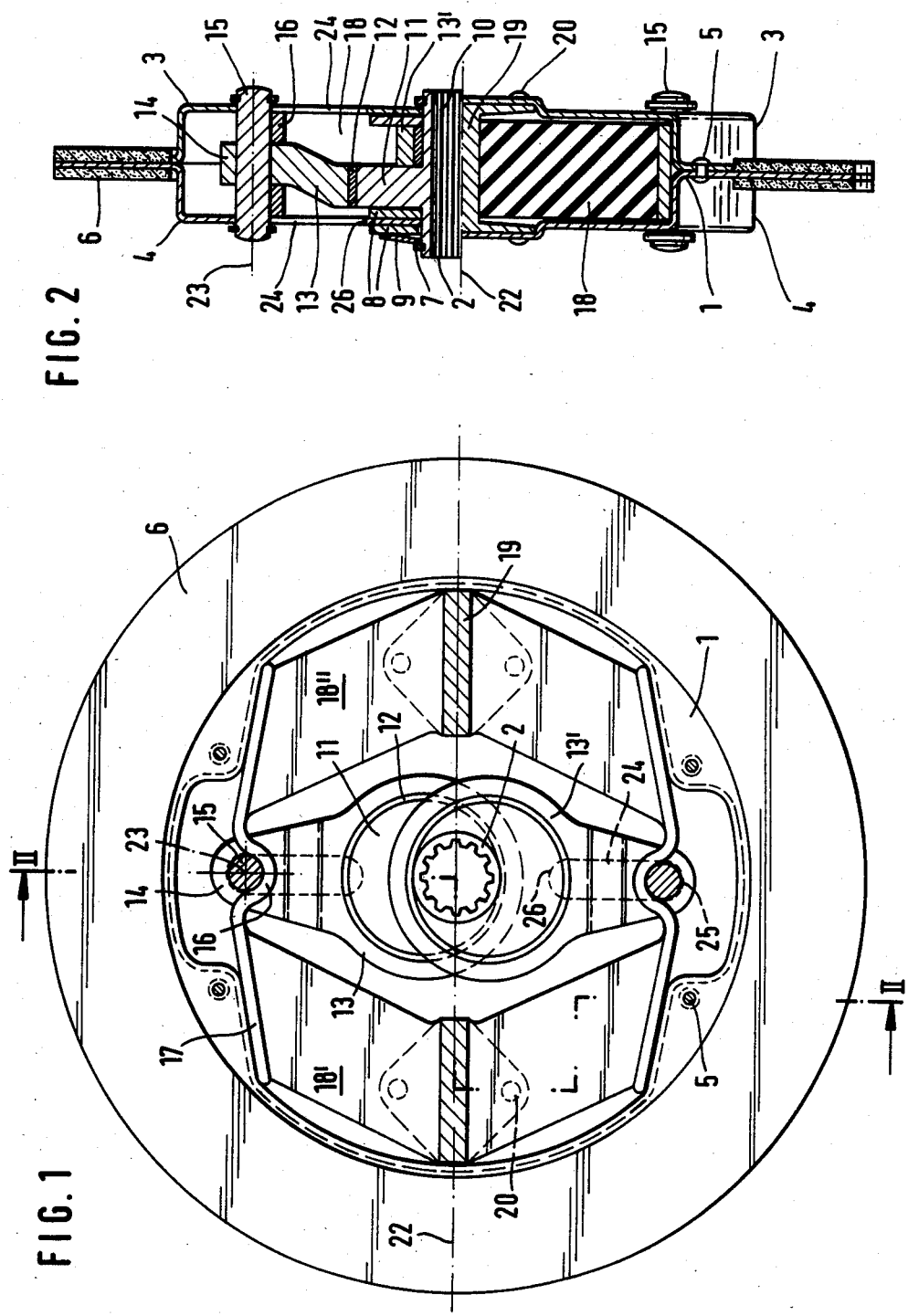

TORSIONALLY RESILIENT COUPLING WITH A CONNECTING ELEMENT

DESCRIPTION

The invention relates to a torsionally resilient coupling with at least one movement-transforming intermediate element which is included between two halves of the coupling in the path of force through the coupling and transforms a rotation into a translation and is connected frictionally in rotation to one of the two coupling halves and is connected frictionally at least substantially in translation to at least one resilient intermediate element which is likewise included in series with the movement-transforming intermediate element in the path of force through the coupling and is in turn connected integrally in rotation to the other of the two coupling halves, and with at least one connecting element which is in turn articulated on the one hand frictionally on the translation side to the movement-transforming intermediate element and on the other hand frictionally and rotatably or pivotably about a bearing pin or bearing bolt to the resilient intermediate element, whilst a side plate, which may be part of a cage, of a capsule shell of a centering plate or of a lining support plate, for example, which is connected integrally in rotation to the coupling half on which the resilient intermediate element/s is/are also maintained integrally in rotation, is provided at least on one side of the connecting elements.

A torsionally resilient coupling of this type disclosed in applications EP Nos. 83 103 977.1 and 0 112 960 A1 corresponding to German Patent Application No. P32 43 644.0). In order to avoid repetitions, the disclosures of the above-mentioned applications are incorporated herein by reference, as a constituent of the original disclosure of the present application.

The coupling according to the above-mentioned applications permits the utilisation of a mutual relative angle of rotation of the two coupling halves up to a value of 180° and permits the path of action to be designed in such a way that the resilient intermediate elements are stressed in compression. Compared to a stressing in traction, the service life of the coupling, particularly under load cycling, is prolonged significantly by a stressing of the resilient intermediate elements in compression. This applies particularly if the resilient intermediate elements are rubber springs, specifically rubber-metal spring packets. In the coupling according to the above-mentioned applications the connecting elements serve the purpose of eliminating, and likewise transforming into a translation component, the residual rotational component at the translation-side output of the movement-transforming intermediate element. However, this rotational residual component remaining on the translation side cannot be totally excluded even where relatively long connecting elements are used, so that there always remains a residual shear component with which the resilient intermediate element is stressed. Practical experience with the coupling according to the above-mentioned applications has meanwhile revealed unexpectedly that a shortening of the service life of the resilient intermediate elements is caused even by such minimal residual components of the shear forces stressing the resilient intermediate elements, and that the maintenance-free service life of the coupling is thereby shortened.

Moreover if, in the case of the torsionally resilient coupling according to the above-mentioned applications, it is required, from safety considerations for example, to exclude a slipping of the coupling at the movement-transforming intermediate element under overload, stop means are provided which either limit the radial spring stroke of the resilient intermediate elements by stop edges or the mutual relative rotation of the two coupling halves by a dog stop. However, such stop means are additional structural elements which increase the mass of the coupling in a totally undesirable manner.

The underlying aim of the invention is to improve a coupling of the type initially described so that, on the one hand, even the remaining residual shear load components in the stressing of the resilient intermediate elements can be totally eliminated, and on the other hand to prevent a slipping of the coupling with means that do not increase the mass of the coupling.

This aim is achieved according to the invention in a coupling of the type initially described, in that at least one slot serving as a slit guideway with a preferably linear radial alignment is constructed in one or at least one of the side plates, through which journal means such as a journal pin or journal bolt (both of which may hereinafter be referred to as "journal pin") engages, by which the connecting element is articulated to the resilient intermediate element or to a support element connected to the latter.

By such a guidance of the connecting element at its point of articulation to the resilient intermediate element, it is possible to achieve a 100% symmetrical distribution of the work introduced via the connecting element into the resilient intermediate element, and therefore to eliminate all shear load upon the resilient intermediate element.

The advantages of the torsionally resilient coupling of the type initially mentioned include an overload protection, which exists particularly in the case of the eccentric preferably used as movement-transforming intermediate element, by a "slipping" of the coupling through an angle of rotation of 180°. If it is proposed to retain this feature of the coupling, then the slot in which the journal pin or journal bolt of the connecting element is guided is dimensioned so that its length is at least equal to, preferably somewhat greater than, the length of the stroke which the journal pin or journal bolt travels in the slot in the case of a mutual relative rotation of the two coupling halves out of the zero position up to the greatest angle of rotation permitted by the movement-transforming intermediate element. In the case of the eccentric disc preferably used as movement-transforming intermediate element, the length of the slot is therefore preferably dimensioned at least as long as the stroke which the journal pin or journal bolt of the connecting element travels in the slot in the case of a mutual relative rotation of the two coupling halves from 0°–180°.

On the other hand, if a stop limitation of the angle of rotation is desired, particularly from safety considerations, in elevators for example, or in order to prevent a failure of the coupling in every case in the motor vehicle construction field, then one end of the slot should preferably be arranged so that the slot can just accommodate the journal pin or journal bolt of the connecting element contactlessly or with negligibly slight contact in the zero position of the coupling, that is to say in the case of a mutual angle of rotation of the two coupling halves of 0°, whereas the opposite end of the slot, which may be positioned both radially inwards and radially outwards according to the configuration of the coupling, is positioned so that the journal pin or journal bolt makes contact at this end of the slot before the angle of rotation of the coupling equals 180° and thereby limits the useful and available angle of rotation of the coupling. The available angle of rotation therefore corresponds to the length of the slot. After contact by the journal pin or journal bolt at this slot end, which limits the angle of rotation of the coupling, the transmission of work through the coupling no longer occurs with torsional resilience, but positively, at least in the case of a stressing of the coupling in the direction of greater angles of rotation.

According to a specific further development of the invention, the movement-transforming intermediate element is preferably an eccentric and the connecting element preferably a connecting rod, of which one eye, generally the larger eye, is mounted rotatably on the eccentric, engaging the latter externally, and the opposite, generally smaller eye of which retains the journal pin, is mounted on the journal pin or is articulated to or mounted on the journal bolt which penetrates the slot with play.

However, the connecting elements need by no means be only rigid connecting rods or thrust rods, but may readily also be flexible traction elements, either firm in traction or limitedly resilient in traction. However, in every case the movement-transforming intermediate element and the connecting element are preferably mutually connected so that the resilient intermediate element is stressed by a compressive force in the case of a relative rotation of one of the two coupling halves relative to the respective other coupling half out of the zero position. In a particularly preferred further development of the invention this is achieved particularly by at least one support plate which rests radially outwards on at least one resilient intermediate element frictionally braced radially inwards and firmly connected to one of the two coupling halves, and to which the movement-transforming intermediate element is articulated in translation via the connecting element so that the support plate is stressed, tensioning or relaxing the resilient intermediate element, in the case of a relative rotation of the other coupling half, which is connected firmly in rotation to the movement-transforming intermediate element. According to this further development of the coupling, a compressive stressing of the resilient intermediate element occurs in the case of a relative rotation out of the zero position, namely in both directions of rotation, whereas the resilient intermediate element is relaxed in the case of a relative rotation towards the zero position.

The coupling according to the invention may preferably be used in motor vehicle construction, namely especially in the transmission line, particularly between the dog plate and the drive output shaft of a clutch. The coupling according to the invention may further be used advantageously as an absorber, particularly a low-frequency absorber. However, by virtue of its great adaptability, it is furthermore obviously useful for practically any purpose in which a torsionally elastic transmission of torques from a first to a second shaft is required.

The invention is explained more fully below with reference to an exemplary embodiment and in conjunction with the drawing, wherein:

FIG. 1 shows in a side view of the radial plane, partly in section, an exemplary embodiment of the coupling with support plate; and FIG. 2 shows a section according to II—II in FIG. 1.

The torsionally resilient coupling shown as an exemplary embodiment of the invention in FIGS. 1 and 2 is designed as part of a clutch. The coupling illustrated in the figures consists of a first coupling half 1 and of a second coupling half 2, which are mutually connected torsionally resiliently and dynamically through the intermediary of intermediate members. The two coupling halves 1, 2 are arranged mutually coaxially and, at least substantially, also coplanarly, namely so that the second coupling half, positioned radially inwards, is surrounded by the first coupling half, positioned radially outwards.

The first coupling half 1 exhibits a centering and cover plate 3 arranged on one side, and on the axially opposite side a likewise centering and covering lining support plate 4, which are firmly mutually connected peripherally by rivets 5. The lining support plate 4 carries friction lining discs 6 on its outer edge in customary manner.

The centering plate 3 and the lining support plate 4 are both axially fixed rotatably on the inner coupling half 2 constructed as the hub of the coupling. This fixing occurs on each side by a circlip 7 which engages into a ring groove made in the hub 2. A floating washer 8 and a friction washer 9 complete the axial fixing of the lining support plate 4. In a manner not shown in FIG. 2, the centering plate 3 may obviously also be fixed in the same manner.

The second coupling half 2 constructed as a hub is provided in customary manner with a female tooth system 10, by which it can be fixed integrally in rotation on an associated shaft.

In the exemplary embodiment of the torsionally resilient coupling described here, the torsionally resilient mutual connection of the two coupling halves 1,2 occurs through two mutually parallel paths of force, which are of mutually symmetrical construction. For the sake of greater clarity of illustration, therefore, only one of the two paths of force will be explained in detail below.

An eccentric disc 11, upon which the lower connecting rod eye of a connecting rod 13 serving as connecting element is mounted through the intermediary of a rolling-contact bearing 12, is arranged integrally in rotation with the second coupling half, integrally with the latter in the present case. The connecting rod head 14 is articulated by its opposite connecting rod eye via a connecting rod bolt 15 centrally in a support 16 of a support plate 17. The support plate is vulcanised onto two mutually symmetrical elastomer spring packets 18′, 18″ which conjointly, as parts of a cooperating rubber spring, form the resilient intermediate element 18 of the torsionally resilient coupling. This resilient intermediate element 18, constructed as an elastomer spring, is braced against a bar 19 which is connected firmly to the centering plate 3 and to the lining support plate 4, and therefore to the first coupling half 1, by rivets 20. The elastomer spring is tensioned under compressive prestress between the support plate 17 and the bar 19, whilst the support plate 17 abuts stops of the first coupling half 1.

Cut out of both the lining support plate 4 and the centering plate 3 is a slot 24 which is penetrated with play by the connecting rod journal bolt 15, which is longer than the interval of the centering plate 3 from the lining support plate 4. The axial fixing of the connecting rod journal bolt 15 occurs by externally attached circlips in the exemplary embodiment shown here.

The slot 24 is precisely aligned radially and serves as a slit guideway for the connecting rod journal bolt 15. One radially outward-located end 25 of the slot 24 is positioned so that it lies on the radial median line of the coupling symmetrically between the two elastomer partial spring packets 18', 18" and can just accommodate the connecting rod journal bolt 15 contactlessly upon impact of the support plate 17 against the first coupling half 1. The opposite, that is to say radially inward-located, end 26 of the slot 24 is positioned radially just slightly farther inwards than corresponds to the point located farthest radially inwards which the connecting rod journal bolt 15 can occupy in the case of a mutual angle of rotation of the two coupling halves of 180°. If it is proposed to limit the maximum possible angle of rotation of the coupling to a smaller value by positive engagement, from safety considerations for example, then the radially inward-located end 26 of the slot 24 is shifted radially farther outwards by a corresponding amount, that is to say the length of the slot 24 is reduced.

In the case of a relative rotation of the first coupling half 1 compared to the second coupling half 2, the eccentric 11 is rotated out of the zero position shown in FIGS. 1 and 2, namely to the right or to the left depending on the direction of rotation of the second coupling half 2. This leads in both cases to a shortening of the radial interval between the median line 22 of the second coupling half and the median line 23 of the connecting rod journal bolt 15. This displacement of the connecting rod journal bolt 15 radially inwards then occurs without any tangential component, because the connecting rod journal bolt 15 is precisely guided radially in the slot 24. Due to this displacement of the connecting rod journal bolt 15 radially inwards, in the illustration of FIGS. 1 and 2 the support plate 17 is forced downwards counter to the return force of the pretensioned elastomer spring 18, which becomes further compressed whilst absorbing and accumulating the work introduced. This introduction of the compression work into the resilient intermediate element 18 then occurs through the guidance of the connecting rod journal bolt 15 in the slot 24 in the two elastomer partial springs 18', 18" with absolutely symmetrical distribution, that is to say with no shear force. This in turn results not only in a longer service life of the elastomer spring, but also, and above all, in an elimination of any imbalance of the coupling, particularly at high rotary speeds. When the input-side coupling half is stressed by a torque, the deformation work thereby introduced into the elastomer spring is absorbed and accumulated by the elastomer spring until the torques acting on the two coupling halves are in equilibrium. In other words, until dynamic equilibrium of moments is reached between input half and output half of the coupling, the moment of inertia appearing in the output half of the coupling is accumulated by transformation of the work introduced into the input half of the coupling into resilient deformation work of the elastomer spring 18. In this context it is obviously irrelevant whether the outer coupling half 1 or the inner coupling half 2 is the input half or the output half of the coupling. The function of the coupling is identical in both cases. In both cases the connecting rod journal bolt 15 is guided strictly radially by the slot 24. In both cases only the mutual angle of relative rotation of the two coupling halves 1, 2 is decisive, that is to say independently of the direction of rotation and independently of the flux of force.

Instead of being articulated to a support plate 17 in the manner shown in FIGS. 1 and 2, the journal bolt 15 of the connecting element 13 may also be directly articulated rotatably to a radially outward-located spring packet, for example an elastomer spring packet. In the case of this construction of the coupling, the eccentric 11 is rotated in its zero position through 180°, relative to the zero position shown in FIG. 1, so therefore, in the case of a deflection of the eccentric with the zero position rotated through 180°, a displacement of the journal bolt 15 occurs radially outwards, whereby a compression of the resilient intermediate element arranged radially outwards in the described manner likewise occurs. Again in the case of this construction of the coupling, the connecting rod journal bolt 15 may be guided in slot slits 24 according to the invention. In contradistinction to the construction of the coupling illustrated in FIG. 1, however, the journal bolt 15 is then located radially inwards in the zero position of the coupling and is guided radially outwards when the coupling is stressed and an angle of rotation is set.

We claim:

1. Torsionally resilient coupling comprising two coupling halves, at least one eccentric mounted on one of said coupling halves and being displaced along a translatory path of travel upon rotation of said one coupling half, at least one connecting rod being disposed within said translatory path of travel of said eccentric, at least one support plate resting radially outwards upon at least one resilient intermediate element frictionally braced radially inwards and connected to one of the two coupling halves and being articulated in translation rotatably about a journal pin via the connecting rod to the eccentric so that the intermediate element is stressed, tensioning or relaxing the resilient intermediate element in the case of a relative rotation of the other coupling half which is connected integrally with the eccentric, and a side plate provided on at least one side of said connecting rod and mounted to the same coupling half as said resilient intermediate element, said side plate including a slot defining a guideway for and engaged by said journal pin, said slot being aligned radially relative to the coupling and arranged so that the articulation point is guided in such a way that the force introduced to said connecting rod via said eccentric is symmetrically distributed over said resilient intermediate element such that the resilient intermediate element is stressed with a compressive force in the case of a mutual rotation of the two coupling halves.

2. Coupling according to claim 1 wherein the length of the slot is at least equal to the length of the stroke which the journal pin travels in the slot in the course of a mutual rotation of the two coupling halves from 0° to 180°.

3. Coupling according to claim 1 wherein one end of the slot is arranged so that the slot can just accommodate the journal pin with not more than slight contact in the zero position of the coupling.

* * * * *